United States Patent

[11] 3,624,164

[72] Inventor Constantinos Georgiou
Wilmington, Del.
[21] Appl. No. 570,162
[22] Filed Aug. 4, 1966
[45] Patented Nov. 30, 1971
[73] Assignee E. I. du Pont de Nemours and Company
Wilmington, Del.
Continuation-in-part of application Ser. No. 186,346, Apr. 11, 1962. This application Aug. 4, 1966, Ser. No. 570,162

[54] PREPARATION OF ALKALI METAL SALTS OF NITROPHENOLS
4 Claims, No Drawings
[52] U.S. Cl............................................... 260/622 R, 260/629
[51] Int. Cl............................................... C07c 79/24
[50] Field of Search........................................ 260/622, 629

[56] References Cited
UNITED STATES PATENTS
1,213,142 1/1917 Aylsworth..................... 260/629
2,196,580 4/1940 Smith et al..................... 260/622
3,283,011 11/1966 Cox.............................. 260/622

OTHER REFERENCES
Popov, "ukrainskii Khim. Zh." 5:105-110 (1930) QD 1 U 45

*Primary Examiner*—Bernard Helfin
*Assistant Examiner*—W. B. Lone
*Attorney*—Francis J. Cromley ABSTRACT: A continuous process for the preparation of alkali metal salts of ortho- and para-nitrophenol, which process comprises continuously contacting and reacting the ortho- and para-chloronitrobenzene with an aqueous solution of sodium or potassium hydroxide under the following reaction conditions:
a. The reaction is carried out within a temperature range of 180° to 250° C. and at autogenous pressure.
b. The time interval for the reaction is from 30 seconds to about 10 minutes.
c. At least 2.0 moles of sodium or potassium hydroxide is charged per mole of ortho- or para-chloronitrobenzene as a 5 percent to 20 percent aqueous solution.
d. The power input into the reaction system is at least 2.3 horsepower per 1,000 gallons of reaction volume.

PREPARATION OF ALKALI METAL SALTS OF NITROPHENOLS

This application is a continuation-in-part of my copending application Ser. No. 186,346, filed Apr. 11, 1962.

This invention is directed to an improved process for the preparation of an alkali metal salt of o- or p-nitrophenol.

Nitrophenols, which are useful intermediates in the synthesis of many organic compounds, are commercially prepared by several known methods. The most common commercial methods of manufacture of nitrophenols are the nitration of phenol, oxidation of nitrocumene, and hydrolysis of chloronitrobenzene. The nitration of phenol yields both ortho- and para-isomers as well as some dinitrophenol compounds. Thus, the nitration process results in a necessary additional step of separating the products of the reaction. Recently a process has been developed for the oxidation of nitrocumene to the hydroperoxide which must be subsequently decomposed to the nitrophenol. Although the process involving the oxidation of nitrocumene can be directed toward a particular isomer of nitrophenol, the oxidation step in this process is of long duration, and the entire process has the disadvantages inherent in a multiple step synthesis.

Another method used to prepare nitrophenols is the hydrolysis of p-chloronitrobenzene to p-nitrophenol sodium salt by heating to 160° C. for 4 hours with aqueous caustic soda (Popov, "Ukrainskii Khim. Zh." 5:105–110 [1930]). This process has heretofore been carried out as a batch process. This batch process has several disadvantages. First of all, the formation of undesirable by-products such as dichloroazobenzene and dichloroazoxybenzene is extremely high in the batch reaction. Secondly, the reaction in the batch procedure does not go to completion unless prolonged heating of the reaction mixture is employed. However, prolonged heating of the reaction mixture is to be avoided for two reasons. First of all, prolonged heating at the reaction temperature is known to result in the decomposition of both the nitrophenol sodium salt and chloronitrobenzene to undesirable by-products. Furthermore, experience has shown that prolonged heating of the reaction mixture at high temperatures has caused the reaction to proceed with violent decomposition resulting in dangerous explosions. When working with the alkali salts of nitrophenols, greatest care must be taken, since under impact or at elevated temperature they may explode. (See Houben-Weyl, VI/II, 35 [1963].) A third disadvantage of the batch process is that productivity is low, since safe reaction temperatures and maximum safe reaction times must be used to provide as high a conversion as possible.

The purity of the product produced by the batch process has also sharply curtailed the use of this process commercially. The removal of the reactant p-chloronitrobenzene from the nitrophenol product is expensive, usually being accomplished by steam distillation. The reaction by-products, which are usually classified as tars or water insolubles, must also be removed before the p-nitrophenol can be used as an intermediate.

There is, therefore, a need for a process for safely producing the sodium salt of p-nitrophenol in essentially a pure state at the highest volume-to-equipment ratio possible. It is to this need that the present invention is directed.

More specifically, the present invention is directed to a continuous process for the preparation of alkali metal salts of ortho- and para-nitrophenol, which process comprises continuously contacting and reacting the ortho- and para-chloronitrobenzene with an aqueous solution of sodium or potassium hydroxide under the following reaction conditions:

a. The reaction is carried out within a temperature range of 180° to 250° C. and at autogenous pressure.

b. The time interval for the reaction is from 30 seconds to about 10 minutes.

c. At least 2.0 moles of sodium or potassium hydroxide is charged per mole of ortho- or para-chloronitrobenzene as 5 percent to 20 percent aqueous solution.

d. The power input into the reaction system is at least 2.3 horsepower per 1,000 gallons of reaction volume.

It has been unexpectedly found that chloronitrobenzene can be hydrolyzed safely at temperatures considerably above 160° C. in a continuous process. It has also been unexpectedly found that a substantial reduction in the formation of by-products, such as dichloroazobenzene and dichloroazoxybenzene, is achieved at such reaction temperatures by the continuous process. It is surprising that both nitrocompounds, the chloronitrobenzene starting material and the nitrophenol alkali metal salt product, can be heated to temperatures as high as 250° C. without giving rise to side reactions or violent decomposition and explosion. It is also surprising that the high temperature hydrolysis reaction produces high yields in as short a reaction time as 30 seconds.

The continuous process of the present invention is carried out as follows. Separate streams of chloronitrobenzene and caustic are continuously fed into a reactor adapted for continuous operation. An example of such equipment is the pipeline reactor well known to those skilled in the art. In the pipeline reactor, the separate streams of chloronitrobenzene and caustic are well mixed in the mixing tee causing the desired reaction. The pipeline reactor is maintained at a reaction temperature of 180° to 250° C. by immersion in a temperature-controlled oil bath, by electric heating or by any other suitable means.

The two streams are brought together at such a rate that the two immiscible phases, the oil chloronitrobenzene phase and the aqueous caustic phase, are well mixed. Since separation of the phases should not occur in the reactor, sufficient turbulence is maintained by controlling the power input on the feed streams to insure intimate contact of the reactants during the passage of the reaction mixture through the reactor. It has been found that the degree of agitation is critical to the continuous production of high purity nitrophenol product. If the power input on the feed streams is less than 2.3 horsepower per 1,000 gallons, conversion rates fall off and the yield of by-product impurities increases. The preferred range of power input on the feed streams is from 4.4 to 13.5 horsepower per 1,000 gallons of reaction volume. Normally, power inputs on the feed stream above 17.0 horsepower are unnecessary.

The caustic stream can be an aqueous solution of either sodium hydroxide or potassium hydroxide. In order to obtain a high purity nitrophenol product, the concentration of hydroxide in the aqueous solution must be maintained at a level of from 5 to 20 percent by weight, preferably 10 to 15 percent by weight. The concentration of the hydroxide in the aqueous solution is important in maintaining safe reaction conditions. It has been found that the water volume is necessary to maintain safe absorption of the heat of reaction. Unless this heat is dissipated in the continuous reaction, violent, uncontrollable reaction conditions exist.

The amount of caustic charged to the reaction must also be maintained at a specified level to obtain high quality nitrophenol in the continuous process. Stoichiometric amounts of 2.0 moles of alkali metal hydroxide to 1 mole of chloronitrobenzene are required to insure completion of reaction. The preferred mole ratio of caustic to chloronitrobenzene is 2.3. An increase in the alkali metal hydroxide over 3 moles per mole of chloronitrobenzene is not harmful, being only excessive and wasteful.

Unexpectedly, it has been found that the instant continuous process can be safely carried out at high temperatures and short reaction times. Thus, the reaction is carried out in the continuous process in a temperature range of 180° to 250° C., preferably 190° to 220° C. The reaction time varies from 30 seconds to 10 minutes, preferably 2 to 8 minutes. The reaction is also carried out under autogenous pressure. At these temperatures, reaction times, and pressure, almost complete conversion rates are obtained with only trace amounts of by-products present in the final product.

The invention is not limited to the exact procedure heretofore described. Variation of the procedure can be made without departing from the scope of the invention. For instance, the mixing and heating may be accomplished in any sequence. Thus, instead of separately preheating the reactants prior to mixing, one reactant, preferably the caustic in this case, may be preheated and mixed with the other reactant in the liquid state. The mixture is then further heated in the reactor. Alternatively, both reactants may be mixed at a relatively low temperature in the liquid state and subsequently brought to reaction temperature.

After the reaction mixture has passed through the reactor, the reaction mass from the reactor is flashed to atmospheric pressure through a let-down valve into a liquid-gas separator where any unreacted chloronitrobenzene is steam distilled off. The aqueous slurry is continuously withdrawn into a receiver and is subsequently cooled to below 60° C. The precipitate consisting of crystalline alkali metal salt of nitrophenol is isolated by filtration in a known manner. The para-alkali metal salt may be recovered directly by any means of filtration; while the ortho-alkali metal salt, being more soluble, is preferably salted out by addition of more caustic to the mixture followed by filtration.

The above-described continuous reaction conditions combine to bring the reaction essentially to completion without allowing over-reaction. It has been found that, if the reaction is brought to completion before the let-down valve, the excess caustic begins to attack the nitrophenol product. This leads to by-products and potentially dangerous conditions. On the other hand, if more than trace amounts of chloronitrobenzene are left in the reaction stream at the pressure let-down valve, the chloronitrobenzene remaining is either lost or must be recovered from the steam distillate coming from the pressure let-down valve. Either alternative adds greatly to the expense of the continuous process. It is, therefore, preferred to conduct the continuous process of the present invention so that less than 0.1 percent of unreacted chloronitrobenzene is present in the reaction mixture at the end of the reaction period.

Both the ortho- and para-chloronitrobenzene can be converted into the corresponding nitrophenolate by the continuous process of this invention.

The free nitrophenol can be easily prepared by modifying slightly the process of this invention heretofore described. The reaction product is converted to the free phenol by cooling the reaction mixture, acidifying with HCl or $H_2SO_4$, and separating either the phenol phase from the aqueous phase of the mixture or separating the phenol as a solid from the reaction mixture, depending upon the temperature during separation.

Representative examples illustrating the present invention follow.

EXAMPLE 1

A stream of molten p-chloronitrobenzene preheated to 187° to 190° C. and a stream of a 15 percent (by weight) of an aqueous solution of sodium hydroxide preheated to 183° to 190° C. were continuously brought together in a mixing tee at a rate of 89.5 parts per minute of p-chloronitrobenzene and 350 parts per minute of the caustic. The power input on the feed streams totaled 13.5 horsepower per 1,000 gallons of reaction volume. The reaction began when the two streams were brought together and continued as the mixture traversed 300 feet of a nickel pipeline reactor having an inside diameter of one-eighth inch. The reactor was maintained at about 230° C. by immersion in an oil bath. The autogenous pressure was between 500 to 600 p.s.i.g. The residence time of the reactants in the reactor was approximately 2 minutes. The reaction mass from the pipeline reactor was flashed to atmospheric pressure through a let-down valve into a liquid-gas separator and was continuously withdrawn into a receiver. The mass was boiled to remove any unreacted p-chloronitrobenzene and cooled to 40° C. The yellow crystalline product was isolated as the dihydrate of p-nitrophenol sodium salt. The product was isolated from the aqueous sodium chloride and caustic soda solution by filtration. The conversion was essentially 100 percent. The yield of isolated product was 98 percent of the theoretical yield, 2 percent being retained in the filtration because of its solubility.

EXAMPLES 2–14

Repeating the procedure of example 1, continuous reactions were carried out under the conditions listed in table I below.

TABLE I

| Ex. | Chloro-nitro-benzene | Caustic Conc. | Mole ratio caustic/chloroni-trobenzene | Reaction, temp., °C. | Reaction, time | Pipeline reactor | Power input, HP/1,000 gallons | Conversion, percent |
|---|---|---|---|---|---|---|---|---|
| 2 | Para | 15% NaOH | 1.0 | 238 | 3' 42" | 1/8" I.D. 300 foot nickel | 2.3 | [1] 62 |
| 3 | do | 15% NaOH | 2.30 | 245 | 2' | .269" I.D. 75 foot steel | 0.13 | [2] 87 |
| 4 | do | 15% NaOH | 1.98 | 230 | 3' 42" | 1/8" I.D. 300 foot nickel | 2.3 | 99.9 |
| 5 | do | 15% NaOH | 3.00 | 238 | 3' 42" | do | 2.3 | 100 |
| 6 | do | 15% NaOH | 2.3 | 220 | 8' | do | 2.3 | 100 |
| 7 | do | 20% NaOH | 2.3 | 230 | 8' | do | 2.3 | 100 |
| 8 | do | 10% NaOH | 2.3 | 220 | 3' 40" | do | 2.3 | 100 |
| 9 | do | 12.8% NaOH | 2.2 | 224 | 3' 43" | 1/4" I.D. 75 foot Inconel | 1.5 | [3] 81.6 |
| 10 | do | 12.7% NaOH | 2.8 | 227 | 2' 7" | do | 8.1 | 100 |
| 11 | do | 12.7% NaOH | 2.8 | 228 | 2' 33" | do | 4.4 | 99.5 |
| 12 | do | 12.0% NaOH | 2.4 | 221 | 2' 10" | do | 6.5 | 99.7 |
| 13 | do | 12.8% NaOH | 2.9 | 220 | 1' 37" | do | 17.0 | 99.8 |
| 14 | do | 16.4% NaOH | 2.3 | 220 | 3' 30" | 1/8" I.D. 300 foot Inconel | 2.9 | 98 |

[1] Insufficient caustic.
[2] Insufficient agitation.
[3] Insufficient agitation-low caustic.

The above table illustrates the effect of various reaction conditions. The caustic concentration has a range of 10 to 20 percent (examples 7 and 8). Examples 2 and 9 demonstrate the necessity for the required stoichiometric amounts of caustic. The importance of the power input on the feed stream is shown in examples 3 and 9 where less than the critical 2.3 horsepower per 1,000 gallons was supplied to the system resulting in an unexpected fall off in conversion rates. It can be seen from all the examples that a short reaction time of 1 minute and 37 seconds gives as satisfactory a yield as 8 minutes.

When ortho-chloronitrobenzene is used in the above examples in place of para-chloronitrobenzene, substantially the same results are obtained in that good yields of ortho-nitrophenol sodium salt is obtained at good conversion rates.

EXAMPLE 15

Repeating the procedure of example 1, continuous reactions were carried out under the conditions listed in table II below to determine the effect of caustic ratios on the continuous process. The pipeline reactor was a 1/8-inch I.D. 300-foot nickel reactor.

TABLE II.—EFFECT OF CAUSTIC RATIO ON QUALITY OF p-NITROPHENOL SODIUM SALT

| | Effect of percent NaOH | Mole ratio caustic/ chloro- nitrobenzene | Reaction time (sec.) | Reaction tempera- ture, °C. | Percent con- version | Percent $H_2O$ insolubles |
|---|---|---|---|---|---|---|
| Run No.: | | | | | | |
| a | 15.0 | 2.3 | 112 | 230 | 100.0 | 0.04 |
| b | 15.0 | 2.0 | 222 | 228 | 99.9 | 0.30 |
| c | 15.0 | 1.0 | 222 | 238 | 62.0 | 10.0 |
| d | 15.0 | 3.0 | 222 | 235 | 100.0 | 0.03 |

From the above, it can be seen that the water insolubles (byproducts) increase by a factor of seven when the caustic is cut from the preferred mole ratio level of 2.3 to a mole ratio level of 2.0. At a mole ratio below 2.0 the impurity level increases rapidly. Impurities above the 0.3 percent level are intolerable and must be removed from the product.

When potassium hydroxide is substituted in the above example for the sodium hydroxide, substantially the same results are obtained.

From the above examples, it can be seen that a safe, continuous process is provided for the hydrolysis of o- and p-chloronitrobenzenes to the corresponding alkali metal salts of nitrophenol with a minimum formation of by-products at a temperature and reaction rate hitherto considered impractical. By conducting the reaction under the critical conditions heretofore described, high yields are obtained without decomposition of the nitro compounds. The continuous process affords greater plant capacity and efficiency.

It is understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A continuous process for the preparation of alkali metal salts of ortho-nitrophenol and para-nitrophenol, which process comprises continuously contacting and reacting a feed stream of ortho- or para-chloronitrobenzene with a feed stream of aqueous caustic solution, said caustic being selected from the group consisting of sodium hydroxide and potassium hydroxide, said reaction taking place
    a. within a temperature range of 180° to 250° C. and at autogenous pressure,
    b. within a time interval of from 30 seconds to 10 minutes,
    c. at a mole ratio of caustic to chloronitrobenzene of at least 2.0, the caustic concentration in the said aqueous solution being maintained at from 5 to 20 percent, and
    d. at a power input into the feed streams of the reaction system of at least 2.3 horsepower per 1,000 gallons of reaction volume.

2. The process of claim 1 wherein the chloronitrobenzene is para-chloronitrobenzene and the caustic is sodium hydroxide.

3. The process of claim 1 wherein the chloronitrobenzene is para-chloronitrobenzene and the caustic is sodium hydroxide and wherein the reaction takes place
    a. within a temperature range of 190° to 220° C. and at autogenous pressure,
    b. within a time interval of from 2 to 8 minutes,
    c. at a mole ratio of caustic to chloronitrobenzene of 2.3, and
    d. at a power input into the feed streams of the reaction system of from 4.4 to 13.5 horsepower per 1,000 gallons of reaction volume.

4. The process of claim 3 wherein a trace amount of unreacted chloronitrobenzene is present at the end of the reaction time interval.

* * * * *